United States Patent
Wu

(10) Patent No.: US 8,885,271 B2
(45) Date of Patent: Nov. 11, 2014

(54) ADJUSTABLE AND REPLACEABLE LENS STRUCTURE FOR PORTABLE ELECTRONIC DEVICES

(71) Applicant: Digilens Co., Ltd., Taipei (TW)

(72) Inventor: Chen-Feng Wu, Taipei (TW)

(73) Assignee: Digilens Co., Ltd., Taipei (TW)

( * ) Notice: Subject to any disclaimer, the term of this patent is extended or adjusted under 35 U.S.C. 154(b) by 0 days.

(21) Appl. No.: 13/858,068

(22) Filed: Apr. 7, 2013

(65) Prior Publication Data

US 2014/0192426 A1  Jul. 10, 2014

(51) Int. Cl.
*G02B 7/02* (2006.01)
*G02B 15/14* (2006.01)

(52) U.S. Cl.
USPC ............................................ 359/823; 359/694

(58) Field of Classification Search
USPC .................................. 359/694–704, 811–830
See application file for complete search history.

(56) References Cited

U.S. PATENT DOCUMENTS 8,596,891 B2 * 12/2013 Kim et al. ...................... 396/419
8,640,351 B2 *  2/2014 Chang .............................. 33/352

* cited by examiner

*Primary Examiner* — Mohammed Hasan

(57) ABSTRACT

A movable and replaceable lens structure for electronic devices has a lens-mounting body mounted on and electrically connected with a electronic device, and a movable lens module mounted on the lens-mounting body and having a movable mechanism mounted on the lens-mounting body or a housing of the electronic device. The movable lens module has a movable mechanism mounted on the lens-mounting body or the housing of the electronic device. A lens is connected with the movable mechanism. An operation part is connected with the movable mechanism. The movable mechanism can be operated to move along a straight line, rotate or pivot, thereby moving the lens to align with an optical axis of the movable lens module and varying the focus of field of view of the movable lens module. Accordingly, the lens with different picture-taking effect can be provided, such as a wide-angle, microscopic or telescopic lens.

15 Claims, 16 Drawing Sheets

ADJUSTABLE AND REPLACEABLE LENS STRUCTURE FOR PORTABLE ELECTRONIC DEVICES

BACKGROUND OF THE INVENTION

1. Field of the Invention

The present invention is related to an adjustable and replaceable lens for portable electronic devices, and more particularly to a lens structure mounted on a body or housing of a lens module with a lens being movably replaced and replaced according to a desired picture-taking effect.

2. Description of the Related Art

New generation portable electronic devices, such as smart phones and tablet computers, which possess processors with high computing power, and play an important role as an indispensable communication tool for daily life of modern people.

Those advanced smart phones or tablet computers are basically equipped with simple fixed-focus lenses only due to the concern of appearance, size and weight, and generate short-distance or long-distance pictures in collaboration with built-in image processing technique upon taking pictures. In reality, those fixed-focus lenses can be at most positioned at the level of regular telephoto lenses while fall short of being qualified as wide angle lens and microscope lens.

To tackle the foregoing concern, lens industry aggressively invests effort in research and development, such as US Patent Publication No. US 2012/0147193, Taiwan Utility Model Patent No. M244478 and the like, which discloses external lens modules being integratable with a mobile phone built in with a digital camera, or with a tablet computer. However, those external lens modules are not designed with universal appearance suitable for various models of portable electronic devices made by different manufacturers. Some structures of those external lens modules are even incorrectly designed to cause damage to electronic function and optical axis misalignment. Moreover, instead of serving as a wide-angle lens with good quality in taking wide-angle pictures and as a high power microscope lens for truly magnifying intricate details of objects taken in close-up pictures, those external lens modules are confined to serve as short-distance telephoto lens or low power microscopic lens only.

SUMMARY OF THE INVENTION

In view of the foregoing problems arising from the conventional lenses, the applicant strives for improvement and innovation, and finally successfully develops a replaceable lens structure of the present invention after years of research.

The objective of the present invention is to provide a movable and replaceable lens structure for portable electronic devices. The movable and replaceable lens structure has a lens-mounting body and a movable lens module.

The lens-mounting body is adapted to electrically connect to a housing of a portable electronic device.

The movable lens module is mounted on the lens-mounting body, and has a movable mechanism, a lens and an operation part. The movable mechanism is mounted on the lens-mounting body and is adapted to be mounted on the housing of the electronic device. The lens is connected with the movable mechanism. The connection part is connected with the movable mechanism. The movable mechanism can be operated to move along a straight line, rotate or pivot, thereby moving the lens to align with an optical axis of the movable lens module and varying the focus of field of view of the movable lens module. Accordingly, the lens with different picture-taking effect can be provided, such as a wide-angle, microscopic or telescopic lens.

DETAILED DESCRIPTION OF THE INVENTION

Figure 1:
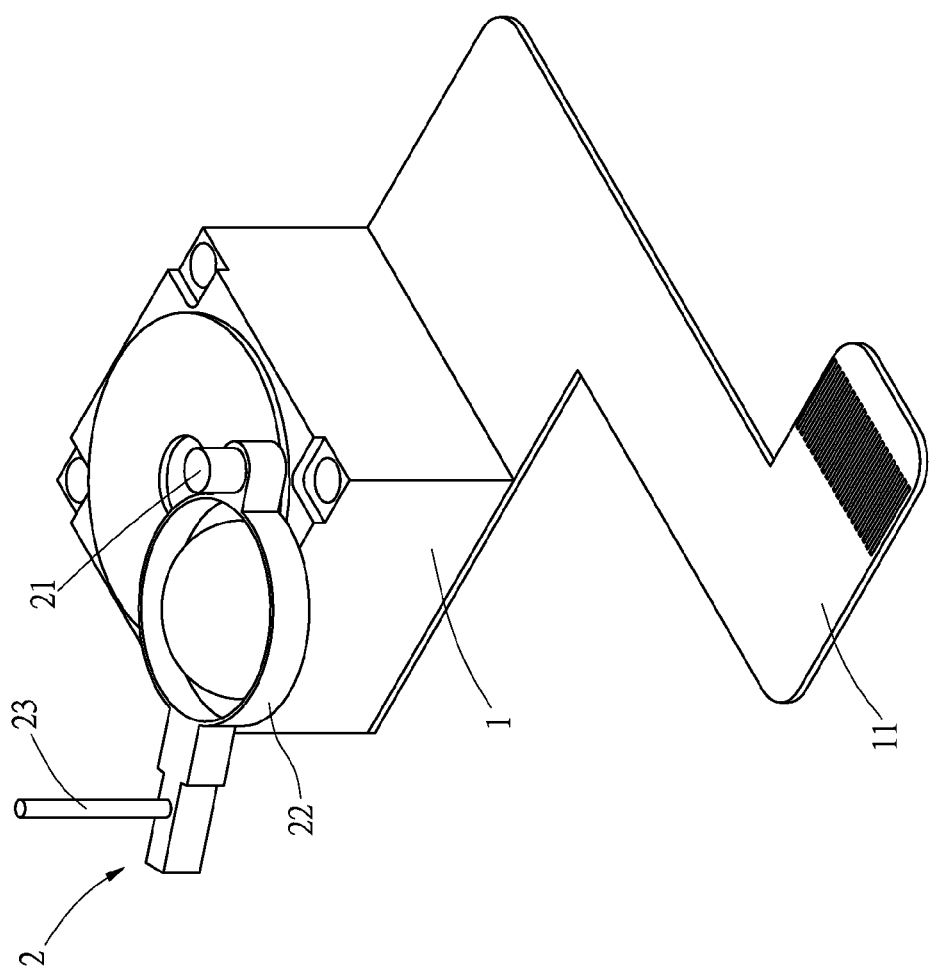
FIG. 1 is a perspective view of a first embodiment of a movable and replaceable lens structure for portable electronic devices in accordance with the present invention.
Figure 2:
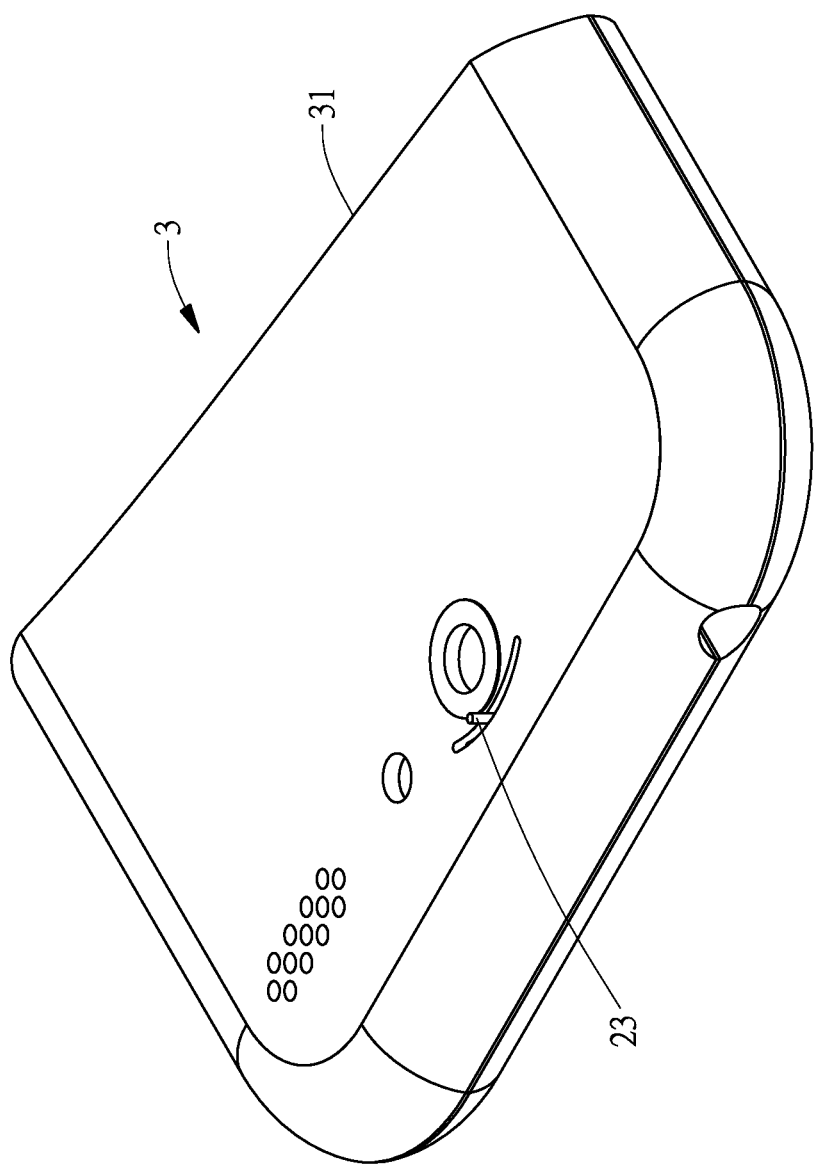
FIG. 2 is a partial perspective view of a portable electronic device having a movable and replaceable lens structure in FIG. 1 mounted inside the portable electronic device.

With reference to FIGS. 1 and 2, a first embodiment of a movable and replaceable lens structure for portable electronic devices in accordance with the present invention has a lens-mounting body 1 and a movable lens module 2. The lens-mounting body 1 has a ribbon cable 11 connected therewith, and is electrically connected with an electronic device 3 through the ribbon cable 11. The movable lens module 2 is pivotally mounted on the lens-mounting body 1, and has a movable mechanism 21, a lens 22 and an operation part 23. The movable mechanism is mounted on the lens-mounting body 1. In the present embodiment, the movable mechanism 21 is a rotary shaft, and is pivotally mounted on one side of the lens-mounting body 1. The lens 22 is connected with the movable mechanism 21, and may be a wide-angle lens or a microscope lens with good quality. The operation part 23 is formed on and protrudes from the movable mechanism 21, and is pivoted with respect to a pivoting center at the rotary shaft for the lens 22 to be pivoted with respect to the lens-mounting body 1 and adjustably mounted on an optical axis of the lens-mounting body 1. Thus, the focus and the field of view of the movable lens module 2 can be varied to provide a wide-angle, microscopic or telephoto picture-taking function.

Figure 3:
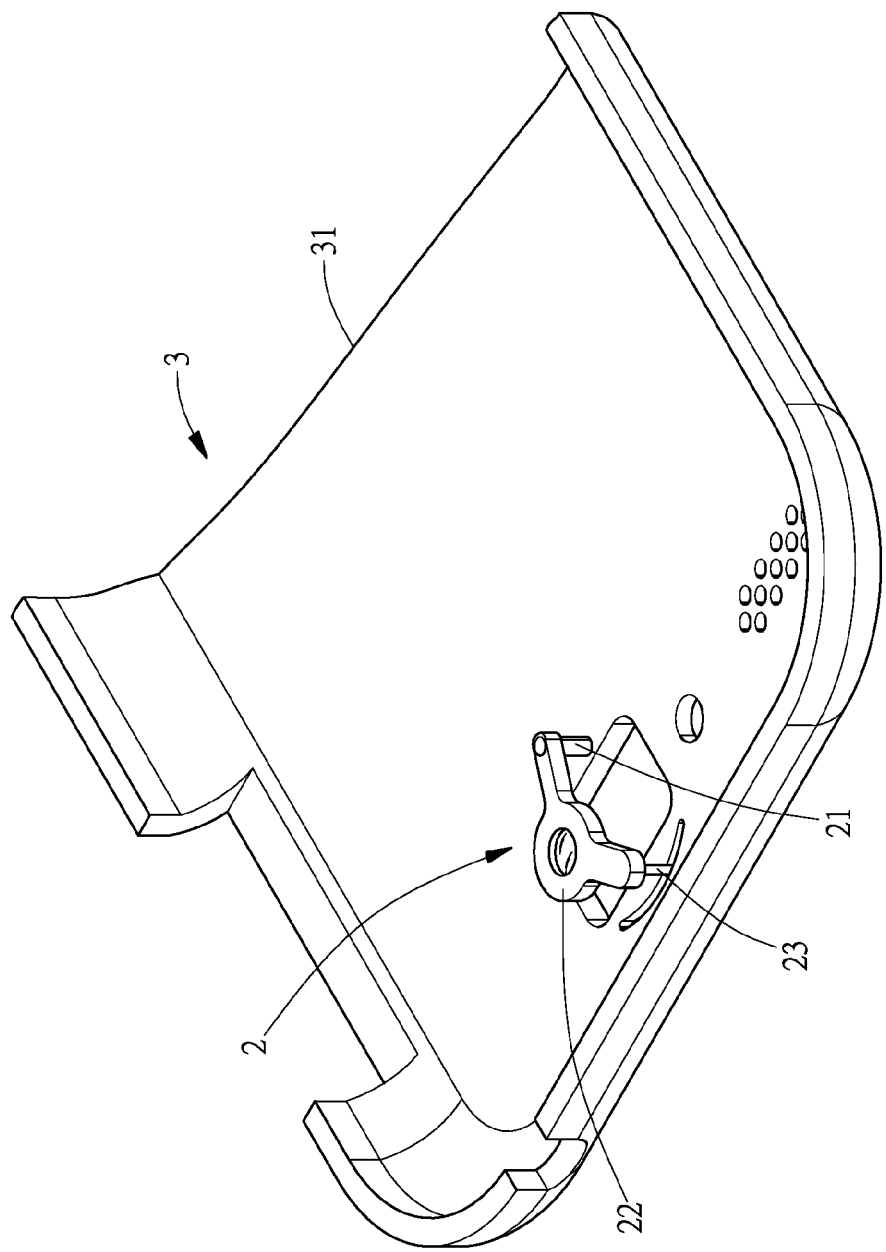
FIG. 3 is a perspective view of the movable and replaceable lens structure in FIG. 1 mounted on an inner side of a housing of the portable electronic device in FIG. 2.

Furthermore, with reference to FIG. 3, the movable mechanism 21 can be mounted on an inner side of a housing 31. The housing 31 may be one of a lid, a detachable lid and an external protection cover. The lens 22 is movably located on a front end of the lens-mounting body 1. The operation part 23 protrudes beyond the housing 31 of the electronic device 3 to achieve the function and effect mentioned in the foregoing description.

Figure 4:
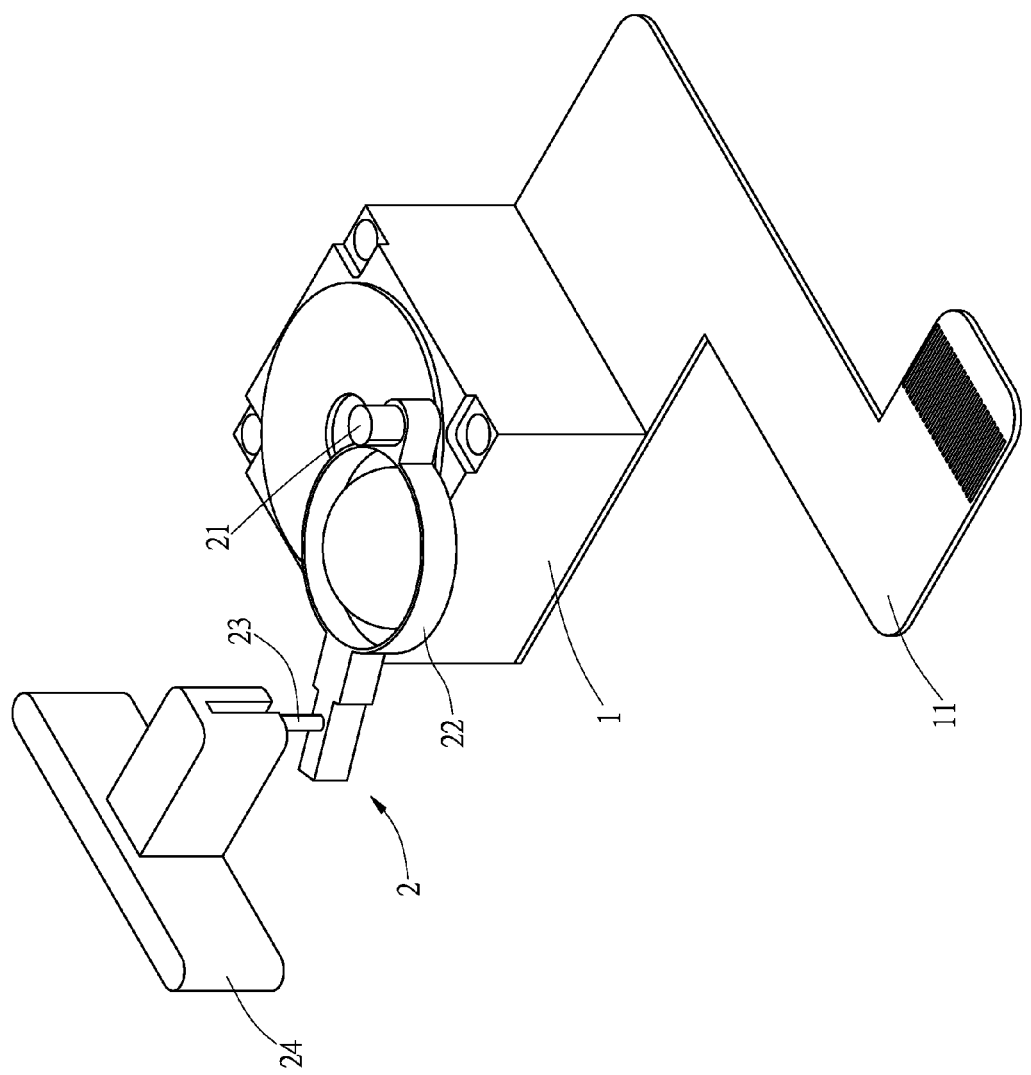
FIG. 4 is a perspective view of a second embodiment of a movable and replaceable lens structure for portable electronic devices in accordance with the present invention.

With reference to FIG. 4, a second embodiment of a movable and replaceable lens structure for portable electronic devices in accordance with the present invention differs from the first embodiment in the lens-mounting body 1. The operation part 23 has an actuation portion 24 pivotally mounted thereon. The actuation portion 24 may have a patterned or rough surface mounted thereon for users' finger to rub to move the actuation portion 24, may protrude beyond the electronic device 3, and is moved along a straight line. Accordingly, the operation part 23 is driven by a linear displacement of the actuation portion 24 to pivot with respect to a pivoting center at the rotary shaft so that the second embodiment is structurally the same as the first embodiment and the objective of aligning a center axis of the lens 22 with the optical axis of the lens-mounting body 1 can be achieved. Meanwhile, users are allowed to replace the lens on the electronic device 3.

Figure 5:
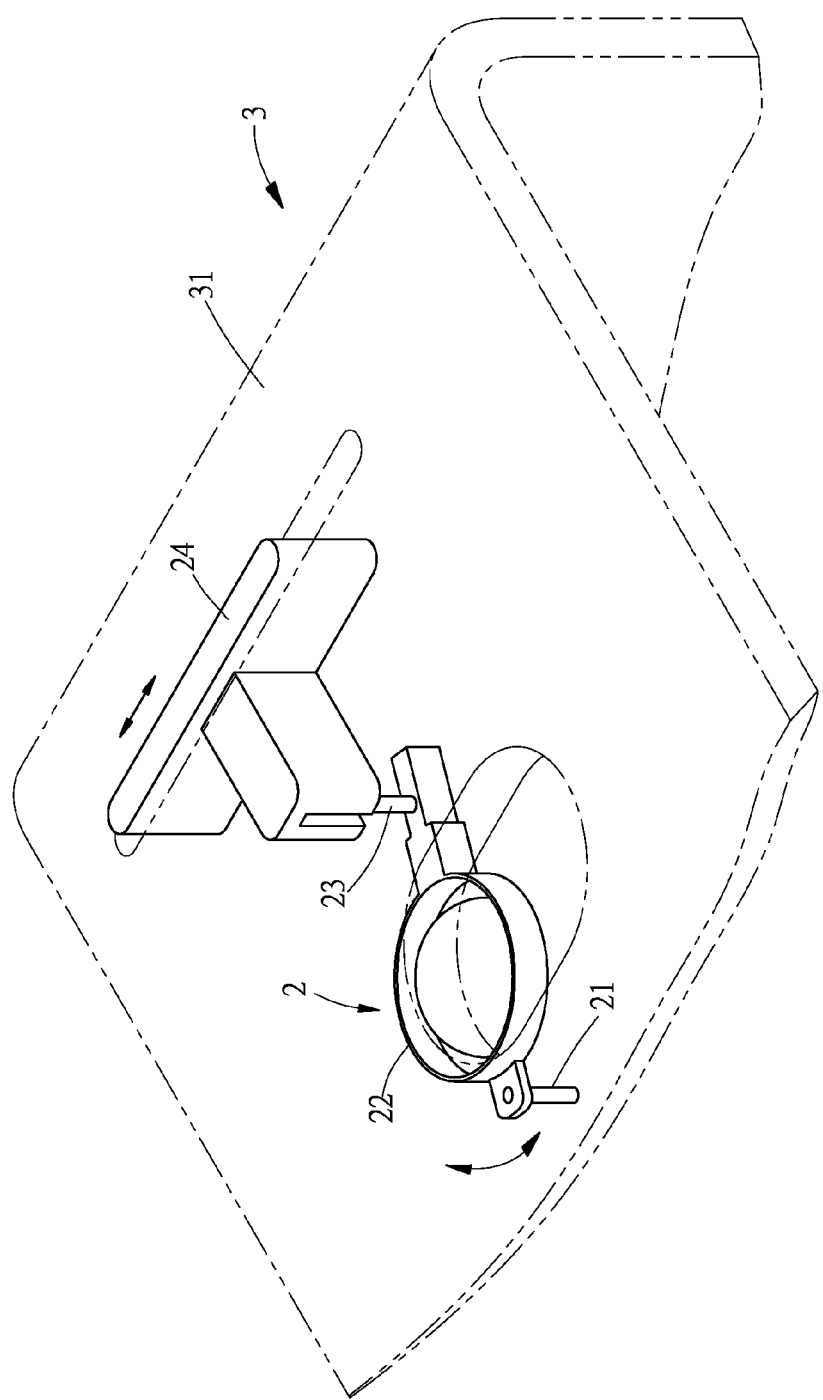
FIG. 5 is a perspective view of the movable and replaceable lens structure in FIG. 4 mounted on an inner side of a housing of a portable electronic device.

Based on the second embodiment, the movable and replaceable lens structure for portable electronic devices in FIG. 5 differs from that in FIG. 4 in that the movable mechanism 21 is pivotally mounted on the housing 31 of the electronic device 3 in an inverse fashion instead of being pivotally mounted on the lens-mounting body 1 to achieve the similar function and effect as provided by the second embodiment in FIG. 4.

Figure 6:
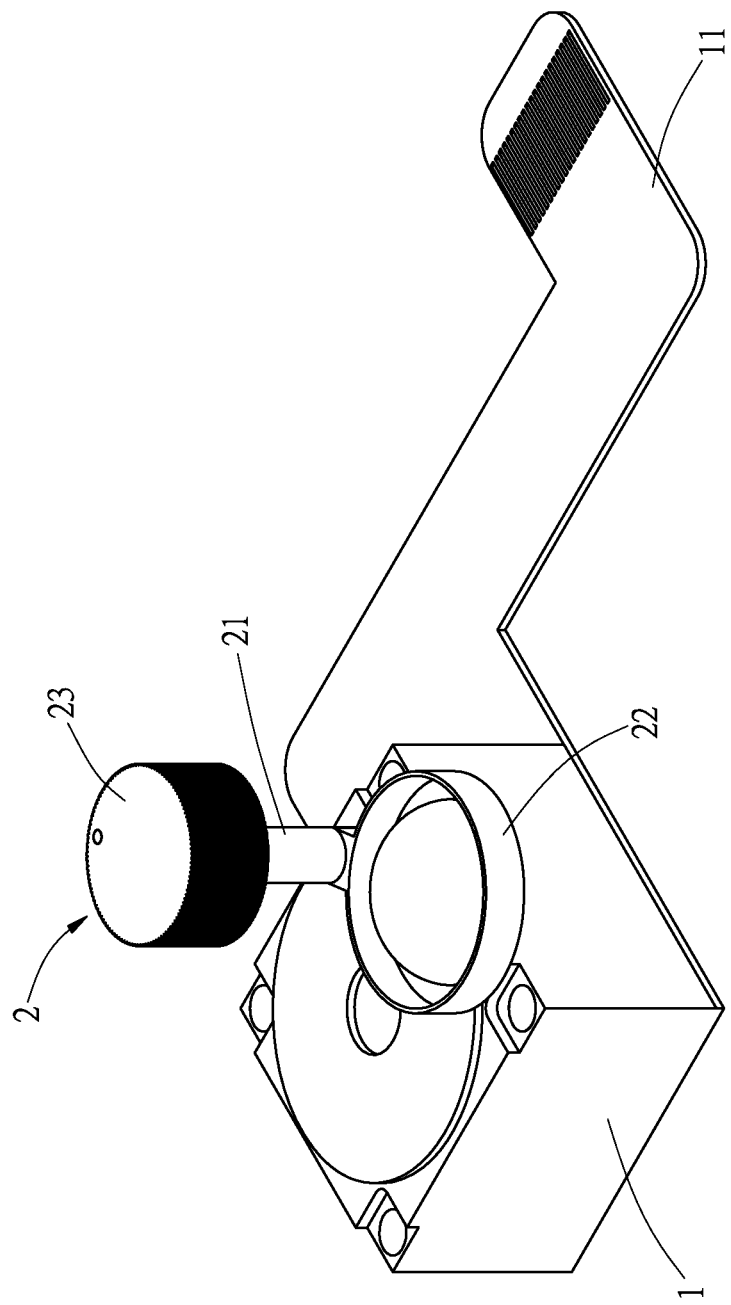
FIG. 6 is a perspective view of a third embodiment of a movable and replaceable lens structure for portable electronic devices in accordance with the present invention.

With reference to FIG. 6, a third embodiment of a movable and replaceable lens structure for portable electronic devices in accordance with the present invention has a lens-mounting body 1 and a movable lens module 2. The lens-mounting body 1 is mounted on and electrically connected to the electronic device 3. The movable lens module 2 is pivotally mounted on the lens-mounting body 1, and has a movable mechanism 21, a lens 22, and an operation part 23. The movable mechanism 21 is pivotally mounted on one side of the lens-mounting body 1. The lens 22 is mounted on the movable mechanism 21. Specifically, the operation part 23 and the movable mechanism 21 are concentric to each other, and the operation part 23 takes the form of a knob, protrudes beyond the electronic device 3, and is turned for operation. When the operation part 23 is turned, the lens 22 is driven and rotated with an optical axis thereof aligning with the optical axis of the movable lens module 2, thereby achieving another objective of the present invention.

Figure 7:
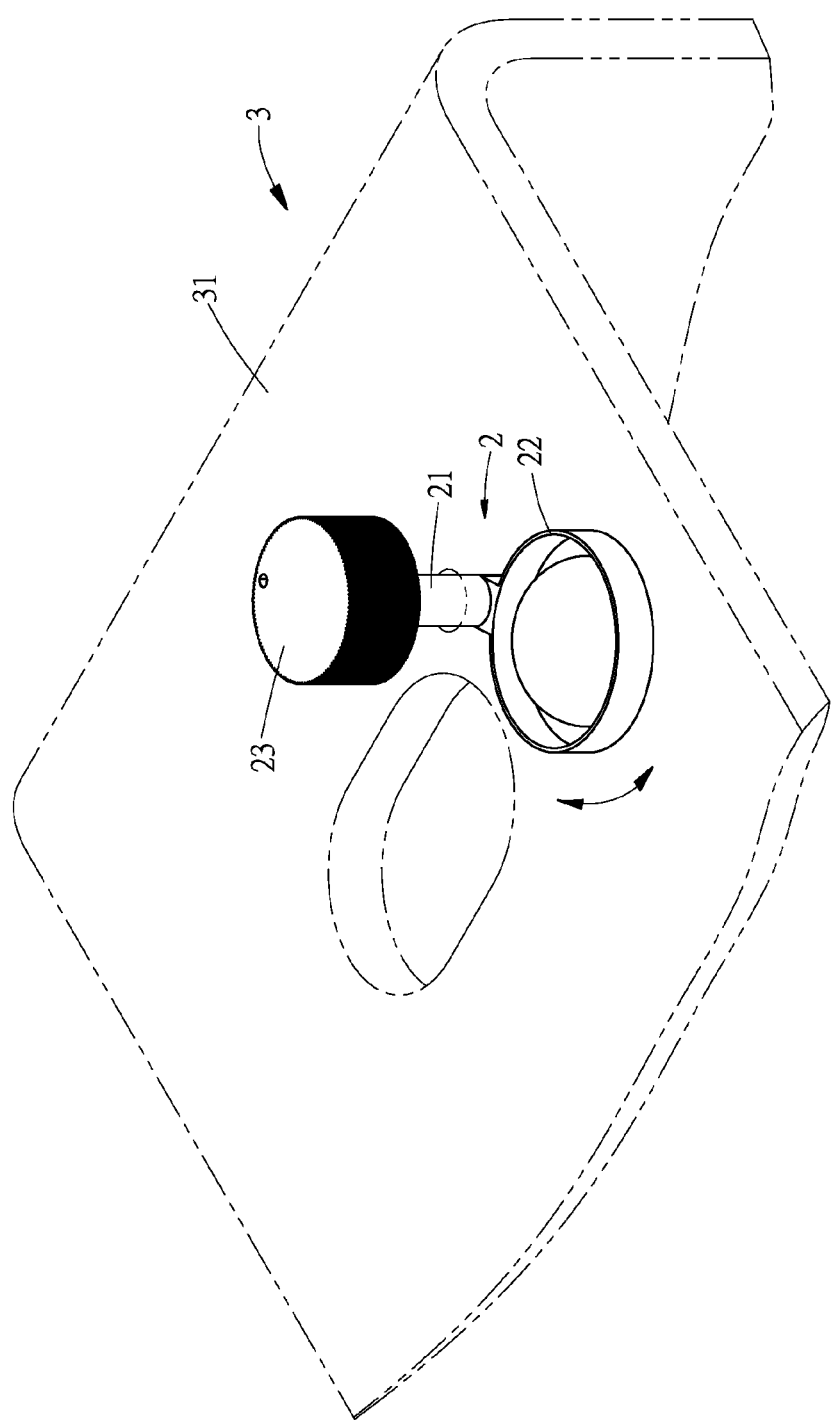
FIG. 7 is a perspective view of the movable and replaceable lens structure in FIG. 6 mounted on an inner side of a housing of a portable electronic device.

With reference to FIG. 7, the movable mechanism 21 and the operation part 23, which are illustrated in FIG. 6, are pivotally mounted on the housing 31 of the electronic device 3 instead of being pivotally mounted on the lens-mounting body 1 to achieve the similar function of the third embodiment.

Figure 8:
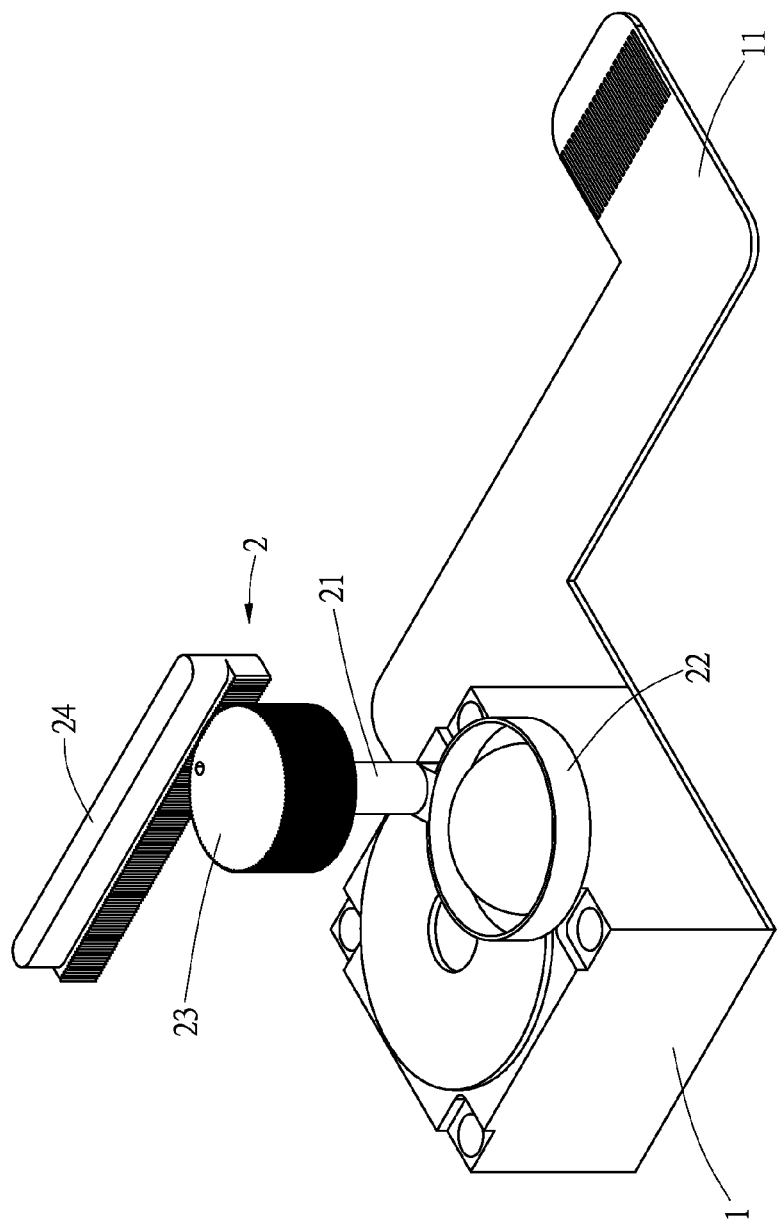
FIG. 8 is a perspective view of a fourth embodiment of a movable and replaceable lens structure for portable electronic devices in accordance with the present invention.
Figure 9:
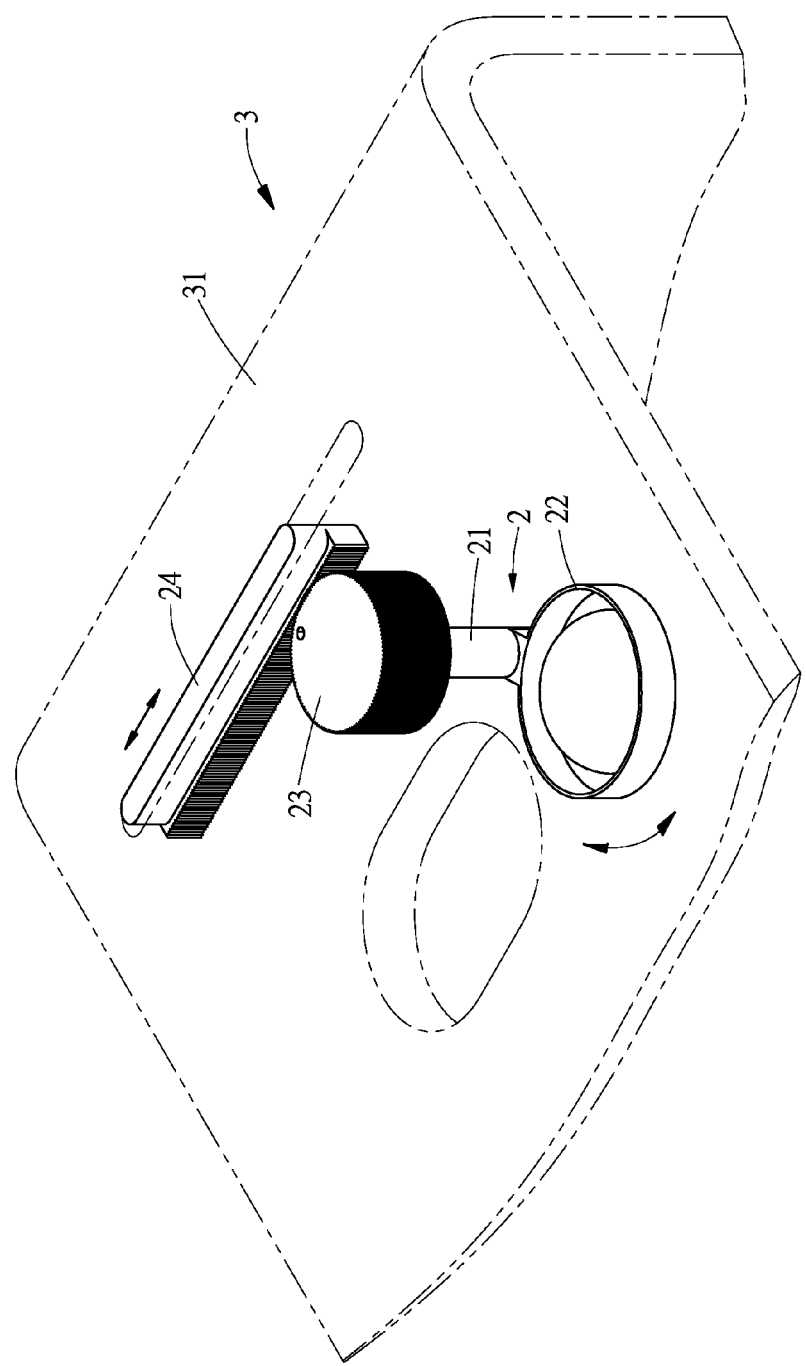
FIG. 9 is a perspective view of the movable and replaceable lens structure in FIG. 8 mounted on an inner side of a housing of a portable electronic device.

With reference to FIGS. 8 and 9, a fourth embodiment of a movable and replaceable lens structure for portable electronic devices in accordance with the present invention is mainly based on the structure of the third embodiment, and differs from the third embodiment in that an actuation member 24 engages or has a friction contact with the operation part 23. The actuation member 24 is linearly actuated and protrudes beyond the electronic device 3. When the actuation member 24 is linearly moved to turn the operation part 23, it is practical for users to directly operate the actuation member 24 to replace lens. Moreover, the movable lens module 2 can be pivotally mounted on the housing 32 of the electronic device 3 to achieve the similar function of the fourth embodiment.

Figure 10:
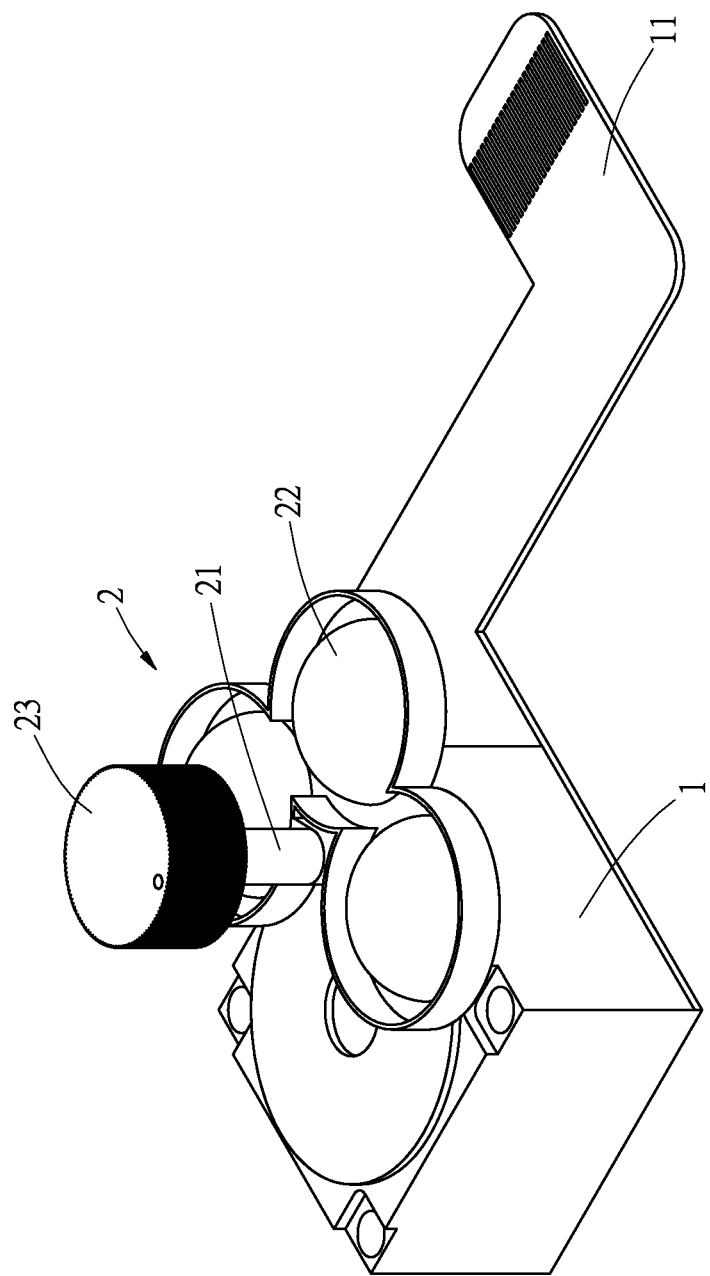
FIG. 10 is a perspective view of a fifth embodiment of a movable and replaceable lens structure for portable electronic devices in accordance with the present invention.
Figure 11:
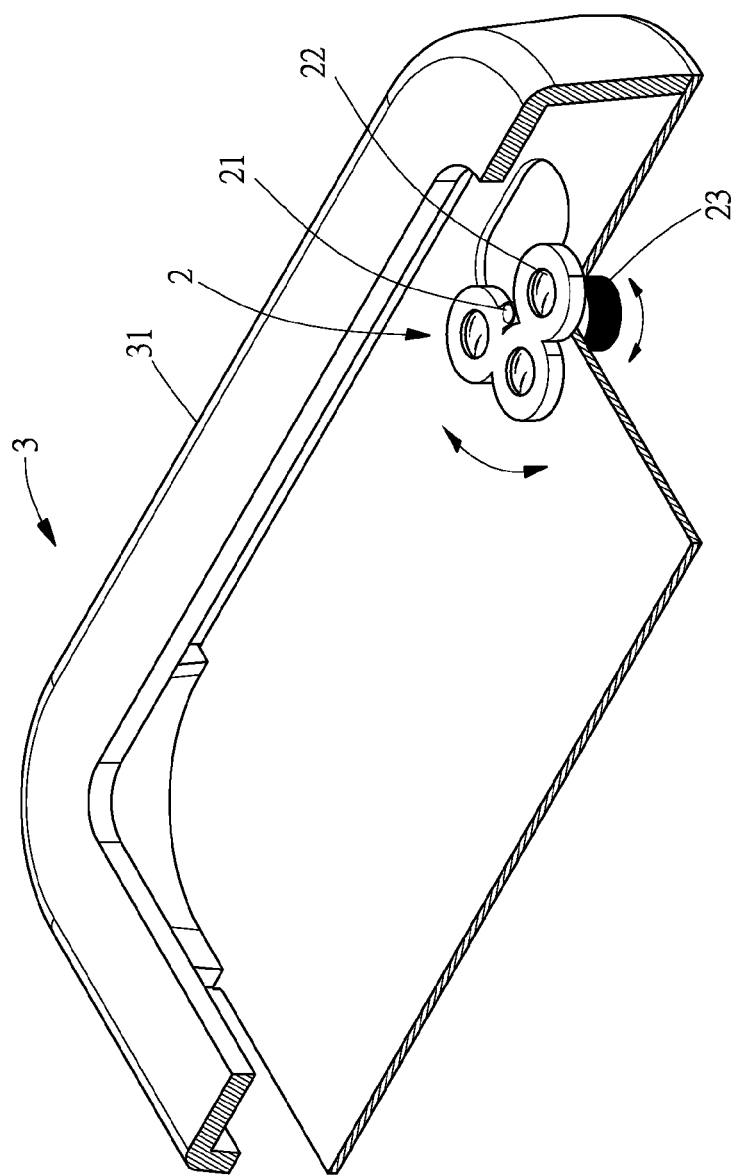
FIG. 11 is a perspective view of the movable and replaceable lens structure in FIG. 10 mounted on an inner side of a housing of a portable electronic device.

With reference to FIGS. 10 and 11, a fifth embodiment of a movable and replaceable lens structure for portable electronic devices in accordance with the present invention is mainly based on the third embodiment, and differs from the third embodiment in that the movable lens module 2 has multiple lenses 22 with different functions, such as wide-angle lens, close-up lens, and other lenses with practical functions. Hence, the lenses with different functions can be moved to align an optical axis thereof with the optical axis of the movable lens module 2 through the operation of the operation part 23 to provide different picture-taking functions and enhance the practicability of the present invention. Besides, similar to the foregoing description, the movable lens module 3 of the fifth embodiment can be pivotally mounted on the housing 31 of the electronic device 3 to achieve the similar function of the fifth embodiment.

Figure 12:
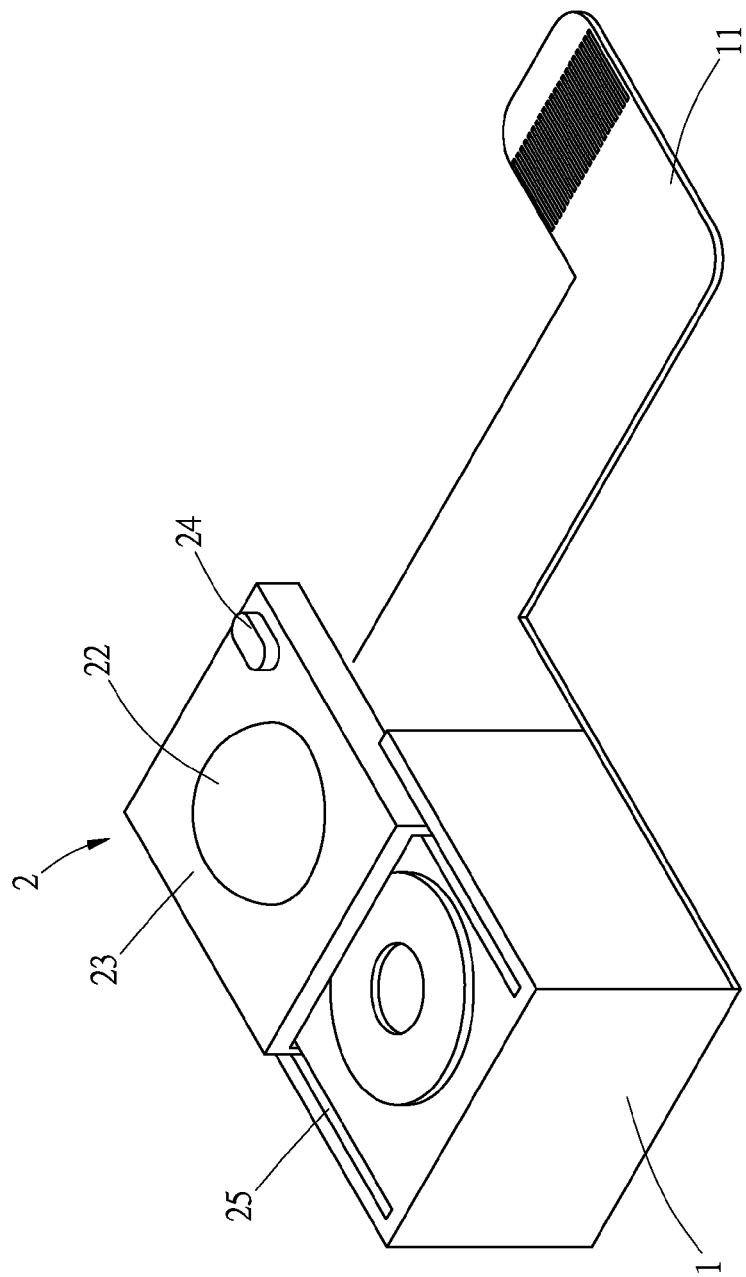
FIG. 12 is a perspective view of a sixth embodiment of a movable and replaceable lens structure for portable electronic devices in accordance with the present invention.
Figure 13:
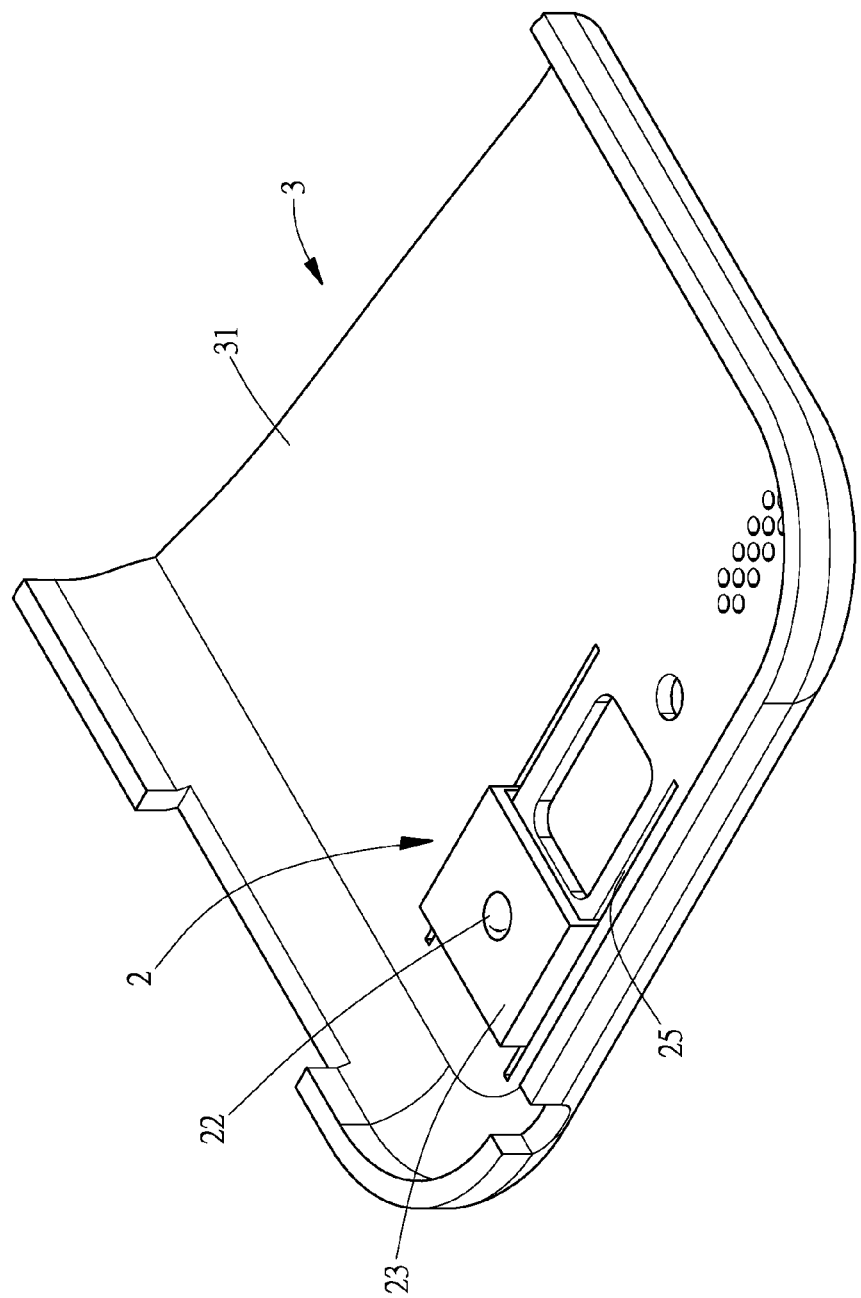
FIG. 13 is a perspective view of the movable and replaceable lens structure in FIG. 12 mounted on an inner side of a housing of a portable electronic device.

With reference to FIGS. 12 and 13, a sixth embodiment of a movable and replaceable lens structure for portable electronic devices in accordance with the present invention has a track 25 formed in the lens-mounting body 1 to engage an operation part 23. The operation part 23 has an actuation member 24 formed thereon and protruding beyond the electronic device 3. The actuation member 24 is directly operated by users and is linearly moved to replace lens. Besides, the track may be formed in the housing 31 of the electronic device 3 to achieve the similar function of the fourth embodiment.

Figure 14:
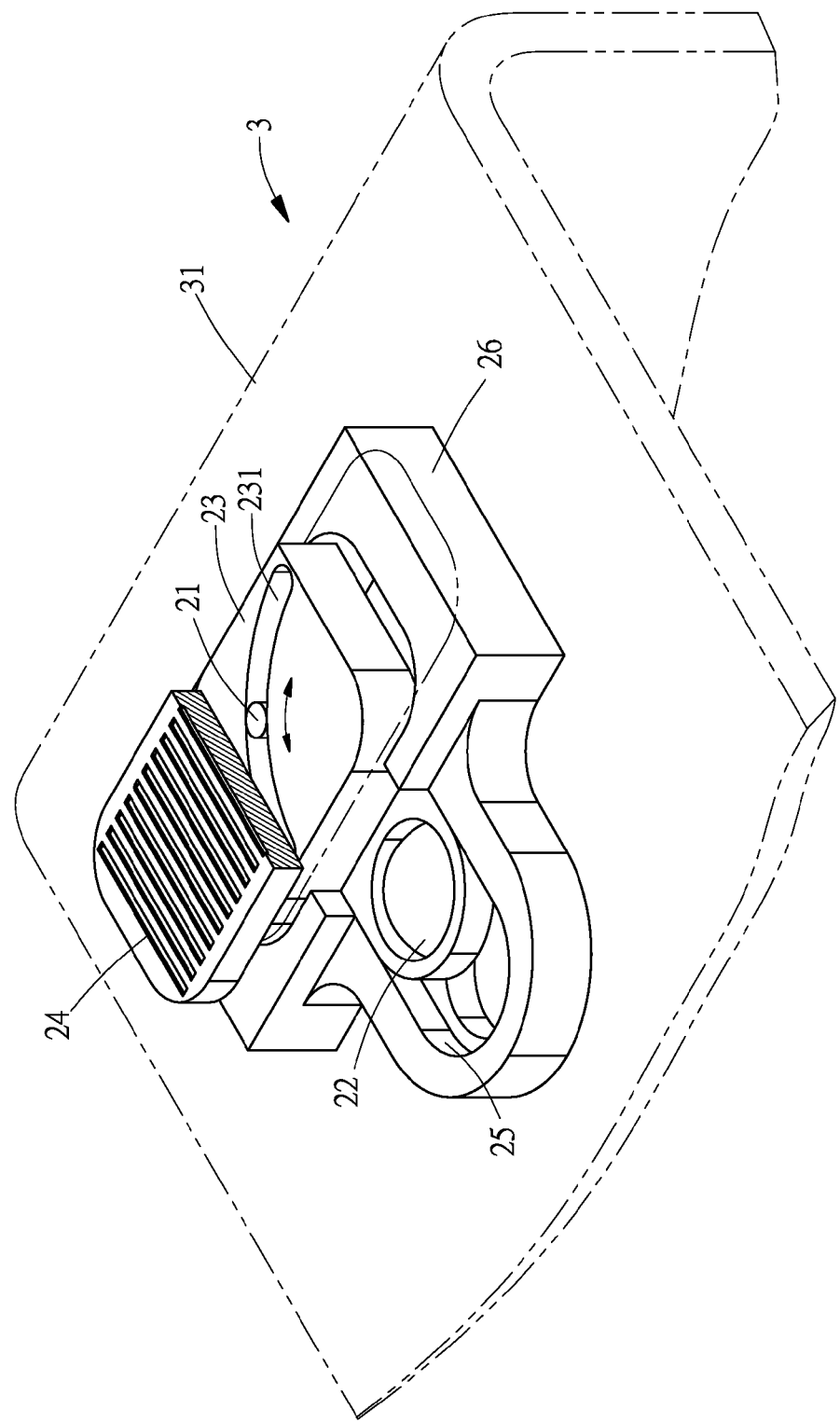
FIG. 14 is a perspective view of a seventh embodiment of a movable and replaceable lens structure in accordance with the present invention mounted on an inner side of a housing of a portable electronic device.

With reference to FIG. 14, a seventh embodiment of a movable and replaceable lens structure for portable electronic devices in accordance with the present invention is shown. In the present embodiment, the movable lens module 2 has a base 26, a track 25, a lens 22, a movable mechanism 21, and an actuation member 24. The base 26 is mounted on an inner side of the housing 31 of the electronic device 3, and is located atop of a lens of the electronic device 3. The track 25 is formed in the base 26. The lens 22 is movably mounted in the track 25, and has an arc-shaped or straight-line channel 221 formed in an end portion of the lens 22. The movable mechanism 21 is rod-shaped and is inserted in the channel 221 with one end of the movable mechanism 21 mounted in the lens 22 and the other end protruding beyond the channel 221. The actuation member 24 is connected with the end protruding beyond the channel 221. The lens is moved by moving the actuation member 24 to adjust the focus and the field of view of the movable lens module 2, thereby providing good wide-angle, microscopic or telephoto picture-taking function.

Figure 15:
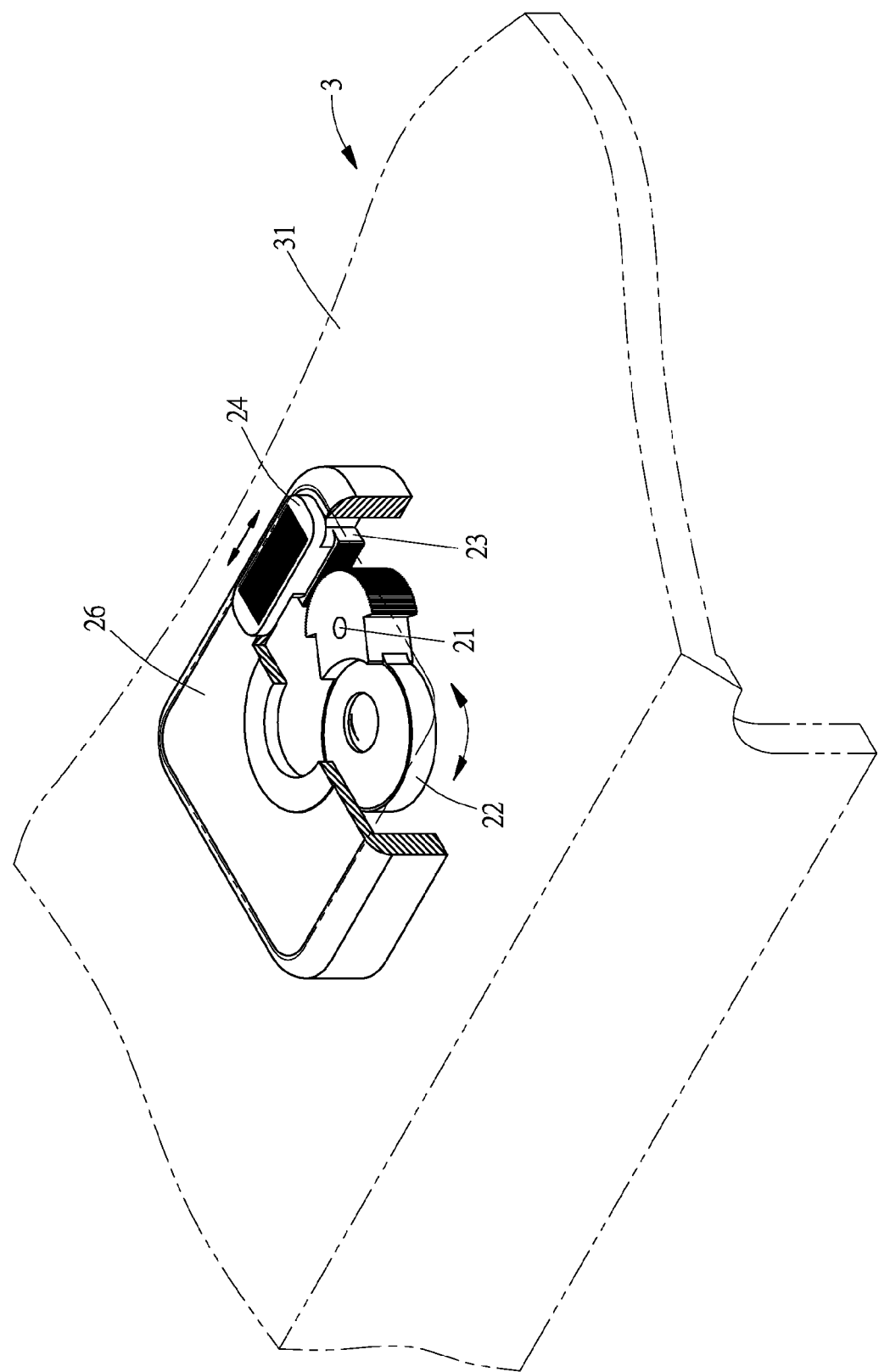
FIG. 15 is a perspective view of an eighth embodiment of a movable and replaceable lens structure in accordance with the present invention mounted on an inner side of a housing of a portable electronic device.

With reference to FIG. 15, an eighth embodiment of a movable and replaceable lens structure for portable electronic devices in accordance with the present invention is shown.

The movable lens module 2 has a base 26, a lens 22, a movable mechanism 21, an operation part 23 and an actuation member 24. The base 26 is mounted on the housing 31 of the electronic device 3. The lens 22 is pivotally mounted inside the base 26. The movable mechanism 21 is pivotally mounted inside the base 26 and is movably connected with one edge portion of the lens 22. The operation part 23 is mounted inside the base 26 and engages or has a friction contact with another edge portion of the movable mechanism 21. The actuation member 24 is formed on the operation part 23, protrudes beyond the base 26, and is moved along a straight line to drive the movable mechanism 21 to pivot so as to adjust the focus and the field of view of the movable lens module 2 and to provide good wide-angle, microscopic or telephoto picture-taking functions.

In the foregoing embodiments, the movable mechanism 21 and the lens 22 may be integrally formed by acrylic plastic or glass material, or combined by metal material, acrylic plastic and glass materials. The lens 22 has an optical axis and an effective diameter range from 1 mm to 7 mm.

Figure 16:
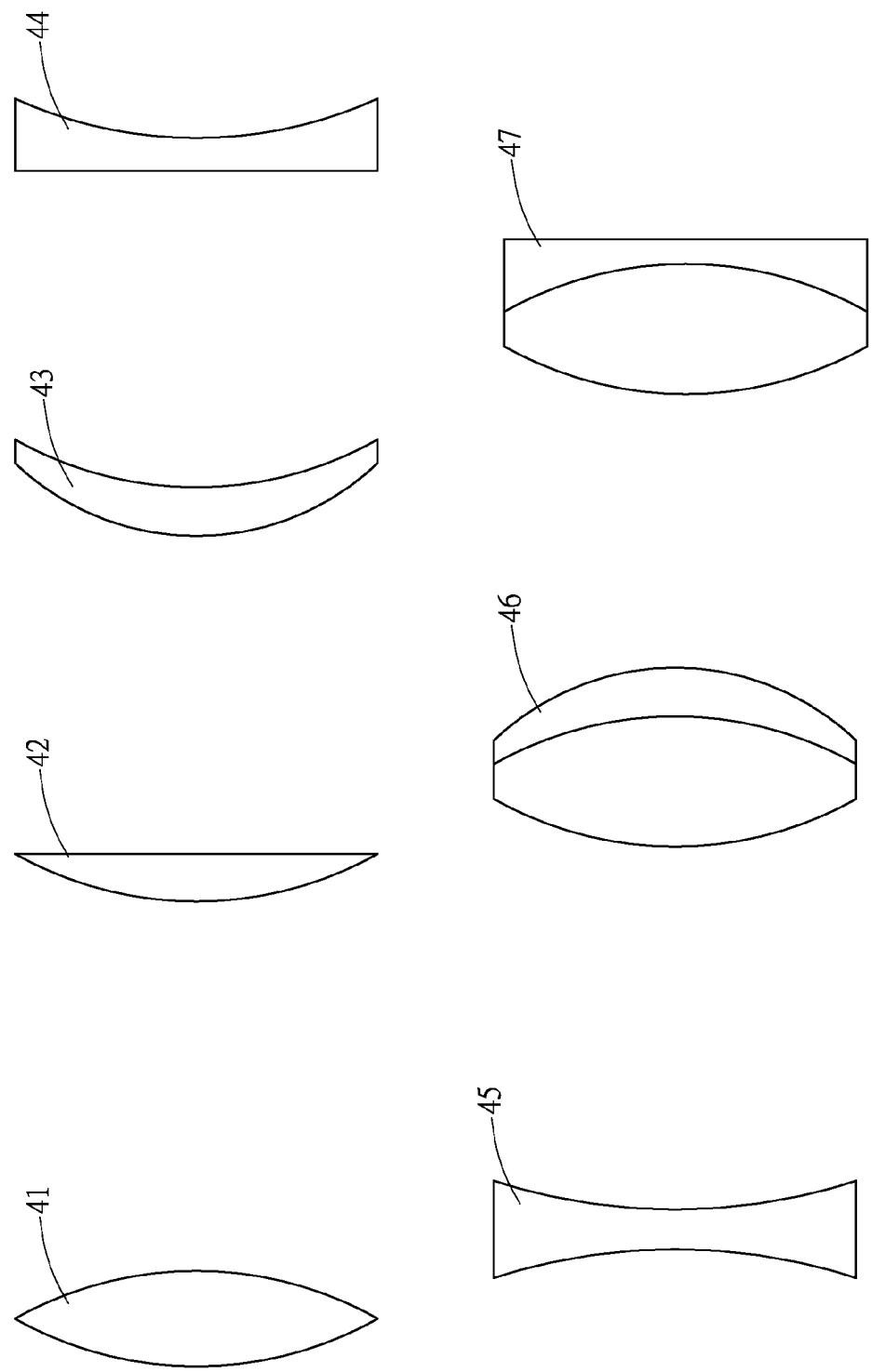
FIG. 16 is a schematic view of lens of a movable and replaceable lens structure in accordance with the present invention.

With reference to FIG. 16, the lens 22 in the movable lens module 2 is a close-up lens having a focus providing a minimum imaging distance. The lens 22 may be a combination selected from a biconvex lens 41, a plano-convex lens 42, a meniscus lens 43, a plano-concave lens 44, a biconcave lens 45, a biconvex achromatic lens 46 and a plano-convex achromatic lens 48 according to a desired picture-taking function. For example, the lens 22 combined by a plano-concave lens 44, a biconcave lens 45 and a meniscus lens 44 provides a wide-angle picture-taking function, and the lens 22 combined by a biconvex lens 41, a plano-convex lens 42, biconvex achromatic lens 46 and a plano-convex achromatic lens 47 provides a microscopic and telescopic picture-taking function.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A movable and replaceable lens structure for portable electronic devices, comprising:
   a lens-mounting body adapted to electrically connect to a portable electronic device; and
   a movable lens module pivotally mounted on the lens-mounting body, and having:
   a movable mechanism mounted on the lens-mounting body;
   a lens connected with the movable mechanism; and
   an operation part connecting with the movable mechanism, operated to drive the movable mechanism for the lens to be movably mounted on an optical axis of the lens-mounting body for varying a focus and a field of view of the lens-mounting body.

2. The movable and replaceable lens structure as claimed in claim 1, wherein:
   the movable mechanism is a rotary shaft, and is pivotally mounted on one side of the lens-mounting body or adapted to be mounted on the housing of the portable electronic device; and
   the operation part is formed on and protrudes from the movable mechanism, and is pivoted with respect to a pivoting center at the rotary shaft for the lens to be pivoted with respect to the lens-mounting body.

3. The movable and replaceable lens structure as claimed in claim 2, wherein the operation part has an actuation member pivotally mounted thereon, is adapted to protrude beyond the portable electronic device, and is linearly moved.

4. The movable and replaceable lens structure as claimed in claim 1, wherein the operation part and the movable mechanism are concentric to each other, and the operation part is pivotally mounted on one side of the lens-mounting body or is adapted to be mounted on the housing of the portable electronic device and to protrude beyond the portable electronic device, wherein the operation part is turned to drive the lens.

5. The movable and replaceable lens structure as claimed in claim 4, wherein an actuation member engages or has a friction contact with the operation part, is linearly actuated, and protrudes beyond the portable electronic device.

6. The movable and replaceable lens structure as claimed in claim 1, wherein the lens-mounting body or the housing of the portable electronic device has a track formed therein to engage the operation part, and the operation part has an actuation member formed thereon and adapted to protrude beyond the portable electronic device.

7. The movable and replaceable lens structure as claimed in claim 1, wherein the movable lens module has:
   a base adapted to be mounted on an inner side of the housing of the portable electronic device; and
   a track formed in the base for the lens to be mounted in the track, and has an arc-shaped or straight-line channel formed in an end portion of the lens for the movable mechanism, which is rod-shaped, to be inserted in the channel.

8. The movable and replaceable lens structure as claimed in claim 1, wherein the housing of the portable electronic device is one of a lid, a detachable lid and an external protection cover.

9. The movable and replaceable lens structure as claimed in claim 1, wherein the movable mechanism is connected to the lens with multiple functions.

10. The movable and replaceable lens structure as claimed in claim 1, wherein the lens is a close-up lens or a microscopic lens, and is formed by a combination selected from a biconvex lens, a plano-convex lens, a biconvex achromatic lens and a plano-convex achromatic lens.

11. The movable and replaceable lens structure as claimed in claim 1, wherein the lens is a wide-angle lens, and is formed by a meniscus lens, a plano-concave lens, and a biconcave lens.

12. The movable and replaceable lens structure as claimed in claim 1, wherein the lens-mounting body has a ribbon cable connected therewith, and is adapted to electrically connect with a portable electronic device through the ribbon cable.

13. The movable and replaceable lens structure as claimed in claim 1, wherein the lens has an optical axis and an effective diameter range from 1 mm to 7 mm.

14. The movable and replaceable lens structure as claimed in claim 1, wherein the lens is formed by acrylic plastic or glass material.

15. A movable and replaceable lens structure for portable electronic devices, comprising:
   a lens-mounting body adapted to electrically connect to a portable electronic device; and
   a movable lens module pivotally mounted on the lens-mounting body, and having:
   a movable mechanism mounted on the lens-mounting body;
   a lens connected with the movable mechanism; and
   an operation part connecting with the movable mechanism, operated to drive the movable mechanism for the lens to be movably mounted on an optical axis of the lens-mounting body for varying a focus and a field of view of the lens-mounting body; wherein:

the movable lens module has a base adapted to be mounted on the housing of the portable electronic device;

the lens is pivotally mounted inside the base;

the movable mechanism is movably connected with one edge portion of the lens;

the operation part is mounted inside the base and engages or has a friction contact with another edge portion of the movable mechanism; and the movable lens module further has an actuation member formed on the operation part, protruding beyond the base, and moved along a straight line to drive the movable mechanism.

* * * * *